(12) United States Patent
Felix et al.

(10) Patent No.: US 12,320,188 B2
(45) Date of Patent: Jun. 3, 2025

(54) DOOR ASSEMBLY ALLOWING SEALED TRANSFER BETWEEN TWO ENCLOSED VOLUMES

(71) Applicant: ABC TRANSFER, Tours (FR)

(72) Inventors: Julien Felix, Tours (FR); Jean-Luc Schneider, Sligo (FR); Thierry Girard, Tours (FR)

(73) Assignee: ABC TRANSFER, Tours (FR)

( * ) Notice: Subject to any disclaimer, the term of this patent is extended or adjusted under 35 U.S.C. 154(b) by 265 days.

(21) Appl. No.: 17/787,497

(22) PCT Filed: Dec. 17, 2020

(86) PCT No.: PCT/FR2020/052497
§ 371 (c)(1),
(2) Date: Jun. 20, 2022

(87) PCT Pub. No.: WO2021/123635
PCT Pub. Date: Jun. 24, 2021

(65) Prior Publication Data
US 2023/0023565 A1    Jan. 26, 2023

(30) Foreign Application Priority Data
Dec. 20, 2019   (FR) ...................................... 1915245

(51) Int. Cl.
*E06B 5/00* (2006.01)
*F16J 13/18* (2006.01)
*F16J 13/22* (2006.01)

(52) U.S. Cl.
CPC ................. *E06B 5/00* (2013.01); *F16J 13/18* (2013.01); *F16J 13/22* (2013.01)

(58) Field of Classification Search
CPC ................................... F16J 13/18; F16J 13/22
See application file for complete search history.

(56) References Cited

U.S. PATENT DOCUMENTS

| | | | | |
|---|---|---|---|---|
| 1,610,766 A | * | 12/1926 | Gildersleeve | B61D 17/04 16/326 |
| 2,295,909 A | * | 9/1942 | Massey | B65F 1/141 220/816 |
| 3,605,337 A | * | 9/1971 | Rodgers | F16J 13/16 49/261 |

(Continued)

*Primary Examiner* — Ernesto A Grano
(74) *Attorney, Agent, or Firm* — McDonnell Boehnen Hulbert & Berghoff LLP

(57) ABSTRACT

The invention relates to a door assembly (1) allowing a sealed transfer between two enclosed volumes, comprising a flange (2) arranged to delimit an opening in one of the enclosed volumes, and a door (4) that extends along an axis (C) and is hingedly fastened to/mounted on the flange (2) so as to move from a closed position in which the door (4) closes the passage opening (3), into an open position, characterized in that the door (4) is fastened to the flange (2) by a double-joint linkage mechanism (5) comprising a first joint (6) arranged to allow a rotational movement about an axis (A) perpendicularly to the axis (C) of the door by a maximum of 30 degrees in relation to the plane of the passage opening (3), and a second joint (7) arranged to allow a rotational movement about an axis (B) parallel to the axis (C) of the door.

18 Claims, 4 Drawing Sheets

(56) References Cited

U.S. PATENT DOCUMENTS

| | | | | |
|---|---|---|---|---|
| 5,184,422 A | * | 2/1993 | Wade | E05F 1/1207 |
| | | | | 49/394 |
| 5,394,650 A | * | 3/1995 | Dean | E05F 1/1215 |
| | | | | 49/386 |
| 5,507,590 A | * | 4/1996 | Argandona | E02D 29/1418 |
| | | | | 49/386 |
| 7,341,398 B2 | * | 3/2008 | Johnson | E02D 29/1418 |
| | | | | 220/816 |
| 7,658,570 B2 | * | 2/2010 | Hill | E02D 29/1418 |
| | | | | 220/232 |
| 7,832,958 B2 | * | 11/2010 | Veldboom | E02D 29/1427 |
| | | | | 404/25 |
| 7,931,168 B2 | * | 4/2011 | DePietro | F16J 13/18 |
| | | | | 220/817 |
| 8,038,031 B2 | * | 10/2011 | DePietro | B65D 90/10 |
| | | | | 16/382 |
| 8,608,021 B2 | * | 12/2013 | Poulter | B60P 3/226 |
| | | | | 220/254.1 |
| 8,646,210 B2 | * | 2/2014 | Mauriac | B63B 19/00 |
| | | | | 49/400 |
| 10,180,022 B1 | * | 1/2019 | Garg | F16J 13/18 |
| 2005/0244227 A1 | * | 11/2005 | Akkala | E02D 29/14 |
| | | | | 404/25 |

* cited by examiner

DOOR ASSEMBLY ALLOWING SEALED TRANSFER BETWEEN TWO ENCLOSED VOLUMES

CROSS REFERENCE TO RELATED APPLICATION

This application is a U.S. National Phase of International Application No. PCT/FR2020/052497 filed Dec. 17, 2020, which claims priority to French Patent Application No. FR1915245, filed Dec. 20, 2019, both of which are incorporated by reference herein in their entirety.

TECHNICAL FIELD OF THE INVENTION

The present invention relates to a door arrangement intended to be fitted to a first enclosed volume and able to allow a sealed connection of a second enclosed volume to the first enclosed volume.

In the present application, "volume" means any product, equipment or installation delimiting a volume. Thus, it can be an enclosure, an insulator, a receptacle, a container, a bag, etc.

"Enclosed volume" is understood to mean a volume isolated from the external environment. This may be in particular, but not exclusively, a volume for preparing, storing and/or handling products that must not be in contact with the outside or with a user.

The door arrangement according to the invention is intended in particular, but not exclusively, to connect two enclosed volumes in order to transfer products from one volume to the other without breaking the containment. This may include, for example, the transfer of hazardous products such as certain biological, chemical or radioactive products, the transfer of components such as stoppers, vials, plungers, syringes, etc., the transfer of environmental control devices such as culture medium plates, particle counters, etc., the transfer of cleaning systems, the transfer of liquids, powders, tools, the transfer of waste to the outside of the enclosure and/or the transfer of any element necessary to production or maintenance of the production line.

PRIOR ART

The transfer of products from one enclosed volume to another without breaking the containment of these volumes is a difficult problem to solve. To respond to this problem, double-door sealed connection devices have been developed. This includes, for example, those described in patent applications FR2777822 and FR3036054.

These double-door connection devices are formed by a first and a second door/flange assembly, one of the door/flange assemblies being that of one of the volumes, the other door/flange assembly being that of the other volume. Conventionally, the enclosed volume to be connected is a receptacle of the transportable container or pouch type, while the other enclosed volume to which the receptacle is connected is generally a fixed handling enclosure. The receptacle is connected to the handling enclosure by connecting the door/flange assemblies together. This connection is generally made by the engagement of what is referred to as a bayonet system—male lugs of the flange and the door of the receptacle engaging, respectively, in notches of the flange and the door of the handling enclosure—followed by a rotation of the receptacle that allows the flange of the receptacle to be locked to the flange of the handling enclosure, as well as allowing the door of the receptacle to be locked to the door of the enclosure, the doors connected to one another being unlocked by unlocking the doors from the respective flanges thereof.

In a known manner, the doors of the handling enclosures are fixed to their respective flange by means of a hinge whose axis, vertical and lateral, is located on the inner face of the flange or of the wall of the enclosure, the doors moving from their closed position to their open position by rotation about the hinge and vice versa. In the open state, the doors extend projectingly within the enclosure, being arranged more or less perpendicular to the plane of the passage opening, which has the effect of hindering the passage of products between the enclosed volumes. Furthermore, the movement of the doors within an enclosure also has the drawback of generating turbulence under the laminar flow, which turbulence breaks the intangible protection barrier of the process created by the laminar flow and therefore generates a risk of contamination of the process.

In order to overcome the problem of obstruction to the passage of products from one volume to another, patent application EP2504102 has proposed a door arrangement offering a door opening angle greater than that obtained with the aforementioned door arrangement. In particular, the door can be arranged, in the open state, in a position substantially parallel to the passage opening. To do this, the door can be moved away from the flange in an initial translational movement along an axis orthogonal to the opening, the flange and the position of the door in its closed state, followed by a subsequent rotational movement about an orthogonal axis. Alternatively, the door can also be moved apart with an initial rotational movement about an axis parallel to the opening, the flange and the position of the door in the closed state followed by a subsequent rotational movement about an axis parallel to the opening, the flange and the position of the door when closed.

Such a door arrangement, however, has the drawback of requiring a door drive system passing through the wall of the enclosure, imposing structural constraints to preserve the sealing of the enclosure in the event of an initial translational movement, or the drawback of generating turbulence like the door arrangements described above in the case of an initial rotational movement.

The invention aims to remedy these problems by proposing a door arrangement offering an optimal opening so as to clear the passage opening of the enclosure while limiting turbulence under laminar flow when opening the door.

SUBJECT MATTER OF THE INVENTION

To this end, and according to a first aspect, the invention proposes a door arrangement allowing a sealed transfer between two closed volumes, comprising a flange arranged to delimit an opening in one of the enclosed volumes, the passage opening defining an opening plane and a passage axis perpendicular to the opening plane, and an axis door hingedly mounted on the flange so as to move between a closed position in which the door closes the passage opening, and an open position, the door arrangement being characterized in that the door is fastened to the flange via a double-joint linkage mechanism comprising a first joint arranged to allow rotational movement about an axis perpendicular to the passage axis by at most 30 degrees with respect to the plane of the passage opening and a second joint arranged to allow rotational movement about an axis parallel to the passage axis.

Advantageously, the second joint is arranged to allow a rotational movement of at least a quarter revolution, and preferably of 180 degrees, relative to the plane of the passage opening.

Advantageously, the double-joint linkage mechanism is motorized. Preferably, each joint is coupled to a motor.

Advantageously, the flange has an outer face provided with magnetic locking catches capable of blocking the flange of the other volume pressed against it.

Advantageously, each locking catch is motorized.

Advantageously, each catch is coupled to a micromotor; said micromotors are associated with means for detecting the presence of the second flange against the first flange.

BRIEF DESCRIPTION OF THE DRAWINGS

Other features and advantages of the invention will become apparent from the following detailed description of the invention with reference to the appended figures, in which.

In the following, the term "rear view" means the view that is in or directed toward the inside space of the enclosed volume defined by the door arrangement. Similarly, the term "front view" means that which is located outside the inside space of the enclosed volume or directed away from the inside of the enclosed volume defined by the door arrangement.

DETAILED DESCRIPTION OF THE INVENTION

In connection with FIGS. 1 to 8, there is described a door arrangement 1 equipping a first enclosed volume. This door arrangement is arranged to allow the connection of a second enclosed volume. Advantageously, the first enclosed volume is a fixed enclosure while the second enclosed volume is a transportable container. This is of course one embodiment, the device according to the invention not being limited to this type of enclosed volumes. When the door arrangement of the first volume and the door arrangement of the second volume are connected to each other, they form a sealed function device allowing the transfer of products between the two enclosed volumes, without breach of containment.

Figure 1:
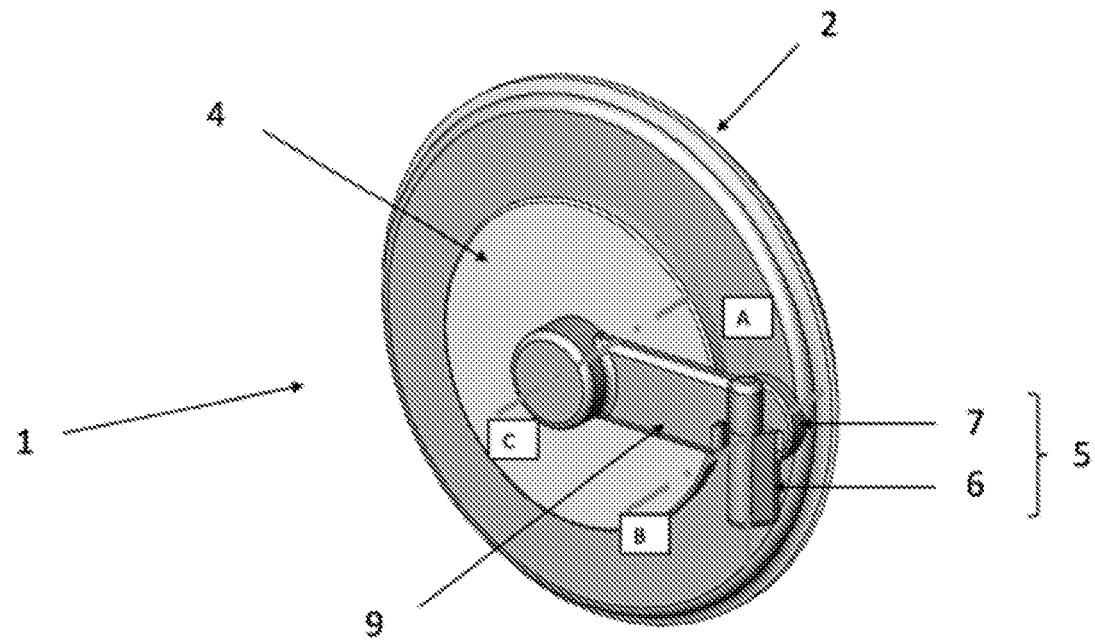
FIG. 1 shows a perspective view of the rear of a door arrangement according to the invention in the closed position.
Figure 2A:
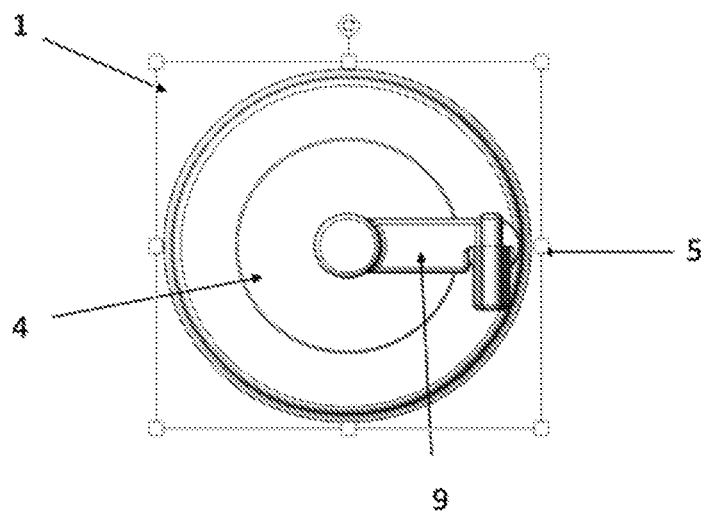
FIG. 2a shows a front view of the door of the arrangement of FIG. 1, in the closed position.
Figure 2B:
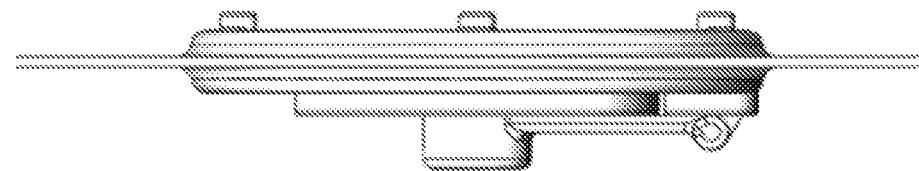
FIG. 2b shows a top view of the door of the arrangement of FIG. 1, in the closed position.

The door arrangement 1 according to the invention comprises a flange 2 and a door 4. The flange 2 is arranged to delimit a passage opening 3 in the enclosure provided with the door arrangement 1, the passage opening 3 defining an opening plane and a passage axis perpendicular to the opening plane, and a door 4 hingedly fastened on the flange 2 so as to move from a closed position, in which the door 4 closes the passage opening 3, to an open position, in which the door 4 extends substantially parallel to the passage opening plane, and vice versa. To do this, the door is fastened to the flange by means of a double-joint linkage mechanism 5. The latter thus comprises a first joint 6 arranged to allow a rotational movement about an axis A perpendicular to the axis C of the door (or to the axis of the passage opening) on the one hand and a second joint 7 arranged to allow a rotational movement about an axis B parallel to the axis C of the door (or to the passage axis of the passage opening) on the other hand (FIG. 1). In the present description, the term "axis of the door" denotes the axis that extends perpendicularly to the door when the latter is in the closed position. The axis of the door therefore corresponds to the passage axis of the passage opening 3. The axis C shown in FIG. 1 will subsequently designate either the axis of the door in the closed position or the passage axis.

The two joints 6 and 7 are arranged with the door 4 so that the opening of the door takes place firstly by the rotational movement about the axis A, then secondly by the rotational movement about the axis B. The first joint 6 is in the form of a hinge, the fixed part of which is secured to the second joint 7 which in turn is coupled to the door by a connection arm 9.

The first joint 6 is arranged to allow a rotational movement of at most 30 degrees relative to the opening plane, while the second joint 7 is arranged to allow a rotational movement of at least 45 degrees, and preferably 180 degrees relative to the opening plane.

Figure 3A:
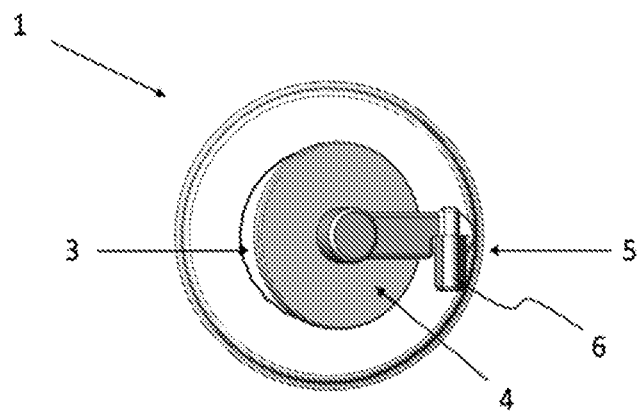
FIG. 3a shows a front view of the door of the arrangement of FIG. 1, in the intermediate open position.
Figure 3B:
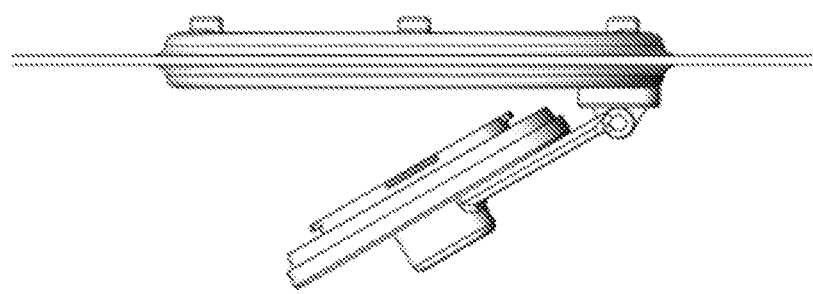
FIG. 3b shows a top view of the door of the arrangement of FIG. 1, in the intermediate open position.
Figure 4A:
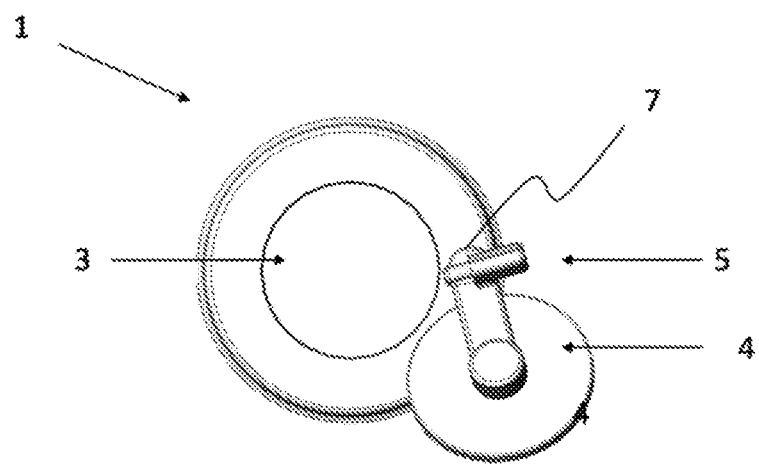
FIG. 4a shows a front view of the door of the arrangement of FIG. 1, in the intermediate open position.
Figure 4B:
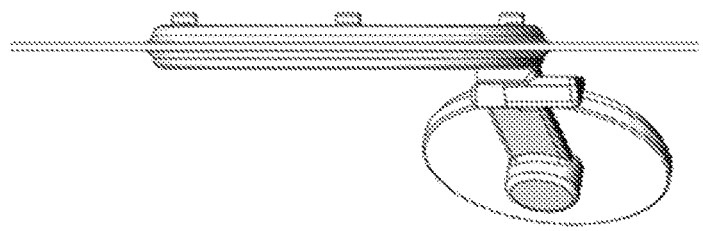
FIG. 4b shows a top view of the door of the arrangement of FIG. 1, in the intermediate open position.
Figure 5A:
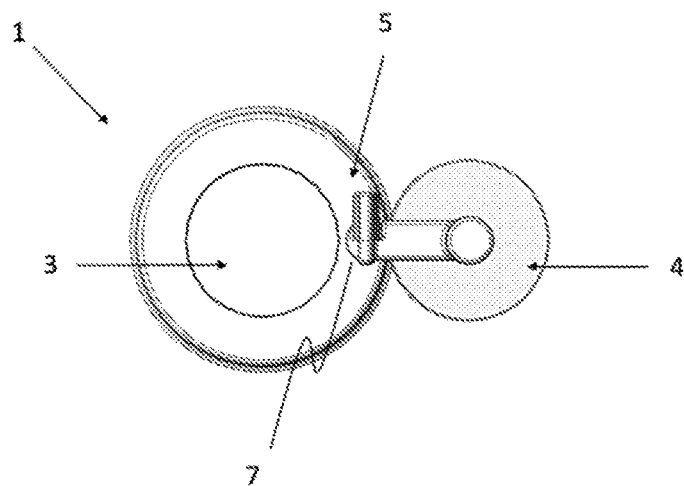
FIG. 5a shows a front view of the door of the arrangement of FIG. 1, in the fully open position.
Figure 5B:
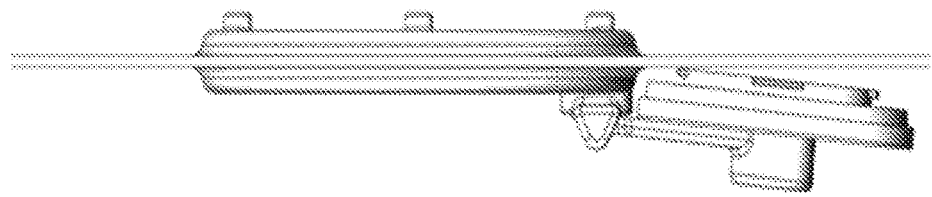
FIG. 5b shows a top view of the door of the arrangement of FIG. 1, in the fully open position.
Figure 6:
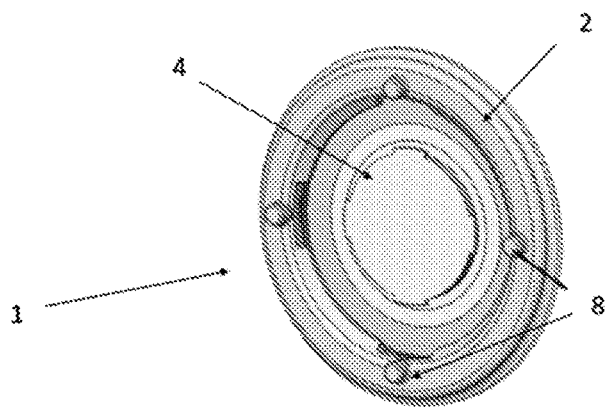
FIG. 6 shows a front perspective view of the door of the arrangement of FIG. 1, in the closed position.

FIGS. 2 to 5 illustrate the rotational movements of the door performed to move from a closed position to an open position. Thus, the opening of the door 4 takes place, from its closed position (FIG. 2), by rotation about the axis A of the hinge (first joint 5) following a stroke of approximately 20 degrees in the example illustrated (FIG. 3). The door 4 is then in a partially open position. The door 4 is then actuated to move in rotation about the axis B of the second joint 7 over a stroke of approximately 180 degrees to reach the final open position illustrated in FIG. 5 passing through intermediate opening positions providing complete clearance of the passage opening 3 (FIG. 4 shows the door in an intermediate opening position). In its final position, the door extends in a plane parallel to the plane of the passage opening, diametrically opposite its closed position.

According to an advantageous embodiment, the door is advantageously motorized. To do this, the first and second joints 6 are each coupled with a motor of the stepping type, for example. It is of course obvious that the invention is not limited to a motorized door, the movement of the latter being able to be carried out manually by actuating a control lever carried by the door, this control lever being able to be provided on the interior side and/or exterior side of the enclosed volume.

As indicated previously, the door arrangement according to the invention allows the coupling of a second volume provided with a second flange that defines a passage opening in the second enclosed volume and closed by a second door. For this purpose, the flange 2 advantageously has an outer face 20 provided with securing means capable of securing and maintaining the flange of the door of the second enclosed volume pressed against it. In the illustrated embodiment, the fastening means of the flange comprise magnetic locking catches 8. It is of course obvious that this is an example embodiment and that other locking means can be implemented, such as for example actuators, without departing from the scope of the invention.

Figure 7A:
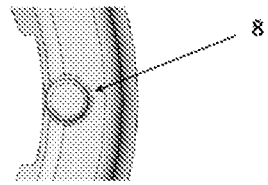
FIG. 7a shows a detail view of a flange locking catch in an unlocked state of the flange.
Figure 7B:
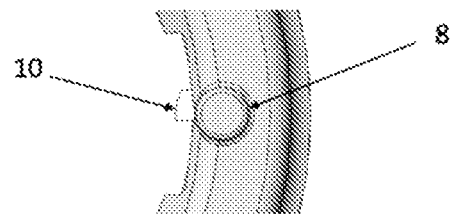
FIG. 7b shows the flange locking catch of FIG. 7a in locked state of the flange.

Each locking catch 8 is provided with a locking lug 10 movable between a position in which the lug is recessed within the flange and a position in which the lug projects radially from the flange 2 toward the passage opening, thus locking the flange of the second enclosed volume. Furthermore, each locking catch 8 is associated with a micromotor able to drive them in rotation to make them move from their unlocked state to their locked state. FIGS. 7a and 7b show a catch in its unlocked position and its locked position.

In the illustrated embodiment, the flange is provided with four locking catches 8 distributed at 90 degrees. This is of course an example embodiment; the number of locking catches may vary according to the dimensions of the door. The flange thus comprises at least two locking catches, advantageously located diametrically opposite one another.

Figure 8:
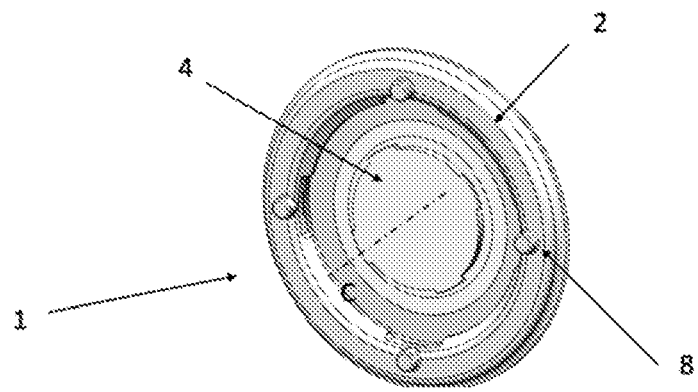
FIG. 8 shows a front perspective view of the door of the arrangement of FIG. 1, in the closed position, the door being in the position secured to the door of the second enclosed volume.

According to FIG. 8, the door 4 performs a rotation about the axis C (advantageously 60°) to unlock the door of the second enclosed volume from the flange thereof and to secure the door of the second enclosed volume with the door 4. In the illustrated embodiment, the door is driven by a motor located in the connection arm 9 and parallel to the axis C.

The invention is described in the foregoing by way of example. It is understood that a person skilled in the art is in a position to produce various variant embodiments of the invention without thereby departing from the scope of the invention.

The invention claimed is:

1. A door arrangement allowing sealed transfer between a first and a second enclosed volume, comprising
   a flange arranged to define a passage opening in the first enclosed volume, the passage opening defining an opening plane and a passage axis perpendicular to the opening plane; and
   a door hingedly mounted on the flange so as to move between a closed position, in which the door closes the passage opening, and an open position in which the door is completely clear of the passage opening,
   characterized in that the door is fastened to the flange by a double-joint linkage mechanism comprising a first joint arranged to allow rotational movement of the door about an axis perpendicular to the passage axis to move the door from the closed position to a partially open position in which the door extends in an inclined plane having an angle of inclination of at most 30 degrees with respect to the plane of the passage opening and a second joint arranged to allow rotational movement of the door kept in the inclined plane about an axis parallel to the passage axis, the first and second joints being arranged with the door so that the opening of the door takes place first by the rotational movement about the axis perpendicular to the passage axis so that the door is in the partially open position, then secondly by the rotational movement about the axis parallel to the passage axis so as to move the door from the partially open position to the fully open position.

2. The door arrangement according to claim 1, characterized in that the second joint is arranged to allow a rotational movement of at least a quarter revolution.

3. The door arrangement according to claim 2, characterized in that the second joint is arranged to allow a rotational movement, of up to 180 degrees, relative to the plane of the passage opening.

4. The door arrangement according to claim 3, characterized in that the double-joint linkage mechanism is motorized.

5. The door arrangement according to claim 4, characterized in that the flange has an outer face provided with magnetic locking catches capable of blocking the flange of the other volume pressed against it.

6. The door arrangement according to claim 3, characterized in that the flange has an outer face provided with magnetic locking catches capable of blocking the flange of the other volume pressed against it.

7. The door arrangement according to claim 2, characterized in that the double-joint linkage mechanism is motorized.

8. The door arrangement according to claim 7, characterized in that the flange has an outer face provided with magnetic locking catches capable of blocking the flange of the other volume pressed against it.

9. The door arrangement according to claim 2, characterized in that the flange has an outer face provided with magnetic locking catches capable of blocking the flange of the other volume pressed against it.

10. The door arrangement according to claim 1, characterized in that the second joint is arranged to allow a rotational movement of up to 180 degrees, relative to the plane of the passage opening.

11. The door arrangement according to claim 10, characterized in that the double-joint linkage mechanism is motorized.

12. The door arrangement according to claim 11, characterized in that the flange has an outer face provided with magnetic locking catches capable of blocking the flange of the other volume pressed against it.

13. The door arrangement according to claim 10, characterized in that the flange has an outer face provided with magnetic locking catches capable of blocking the flange of the other volume pressed against it.

14. The door arrangement according to claim 1, characterized in that the double-joint linkage mechanism is motorized.

15. The door arrangement according to claim 14, characterized in that the flange has an outer face provided with magnetic locking catches capable of blocking the flange of the other volume pressed against it.

16. The door arrangement according to claim 1, characterized in that the flange has an outer face provided with magnetic locking catches capable of blocking the flange of the other volume pressed against it.

17. The door arrangement according to claim 16, characterized in that each locking catch is motorized.

18. The door arrangement according to claim 17, characterized in that each catch is coupled to a micromotor.

* * * * *